April 21, 1925.

O. M. TUCKER ET AL 1,534,996

INTERCHANGEABLE SPOUT APERTURE BUSHING AND METHOD OF APPLYING THE SAME

Original Filed Sept. 23, 1918    2 Sheets-Sheet 1

Oliver M. Tucker
William A. Reeves INVENTORS

BY

*Edwin P. Corbett*
ATTORNEYS.

April 21, 1925.
O. M. TUCKER ET AL
1,534,996
INTERCHANGEABLE SPOUT APERTURE BUSHING AND METHOD OF APPLYING THE SAME
Original Filed Sept. 23, 1918    2 Sheets-Sheet 2

Oliver M. Tucker
William A. Reeves INVENTORS

BY
ATTORNEYS.

Patented Apr. 21, 1925.

1,534,996

UNITED STATES PATENT OFFICE.

OLIVER M. TUCKER AND WILLIAM A. REEVES, OF COLUMBUS, OHIO.

INTERCHANGEABLE SPOUT-APERTURE BUSHING AND METHOD OF APPLYING THE SAME.

Original application filed September 23, 1918, Serial No. 255,349. Divided and this application filed November 11, 1924. Serial No. 749,317.

*To all whom it may concern:*

Be it known that we, OLIVER M. TUCKER and WILLIAM A. REEVES, citizens of the United States of America, residing at Columbus, in the county of Franklin and State of Ohio, have invented certain new and useful Improvements in Interchangeable Spout-Aperture Bushings and Methods of Applying the Same, of which the following is a specification.

Our invention relates to interchangeable spout aperture bushings and a method of applying the same. It aims to provide a novel form of bushing which constitutes a delivery orifice for spouts and which is readily applicable to a permanent spout aperture by such a method that a gas-tight and glass-tight joint will result. Then, it aims to provide a method of application which will ensure this tight joint and yet permit of the ready separation necessary for the frequent replacements demanded. The bushing itself has certain novel characteristics but, of equal importance, is the method of application.

Our invention, furthermore, aims to provide a novel method and apparatus for stopping the flow of glass through the spout and delivery bushing, so as to permit replacements of the delivery bushing. We desire it to be understood, however, that the use of this method and apparatus for stopping the flow of glass is not to be limited to spouts of the type having delivery bushings which are adapted for frequent replacement, but may be used with spouts having delivery bushings which are permanently attached to the delivering spout or may be used with delivering spouts having any desired type of delivery orifice.

This case is a division of applicants' co-pending application, Serial No. 255,349, filed September 23, 1918, on which Patent No. 1,519,885 was issued Dec. 16, 1924, interchangeable spout aperture bushings and a method of applying the same.

Our invention is peculiarly adapted to use in apparatus for producing preformed charges of viscous glass, that is, charges whose cross-sections are to be fixed by extrusion through the bushings in question. With this in view and with an understanding of the difficulties attendant upon the flowing of glass at a high temperature, it will be understood that bushings must be frequently changed.

All the workers in the art appreciate the difficulties which arise from the almost irresistible tendency of hot viscous glass to seep into any joint or crack with which it comes into contact. When this occurs, the abutting surfaces are so cemented that, if they are of clay, one or the other will break in separating. Then, when it is understood that we intermittently support the glass between successive extrusions by an enclosed gas burning under pressure, it will appear that we are also faced with the necessity of having a gas-tight as well as a glass-tight joint, which joint, however, must be readily breakable without destruction of abutting surfaces.

The preferred embodiment of our invention is shown in the accompanying drawings wherein similar characters of reference designate corresponding parts and wherein.

Figure 2:
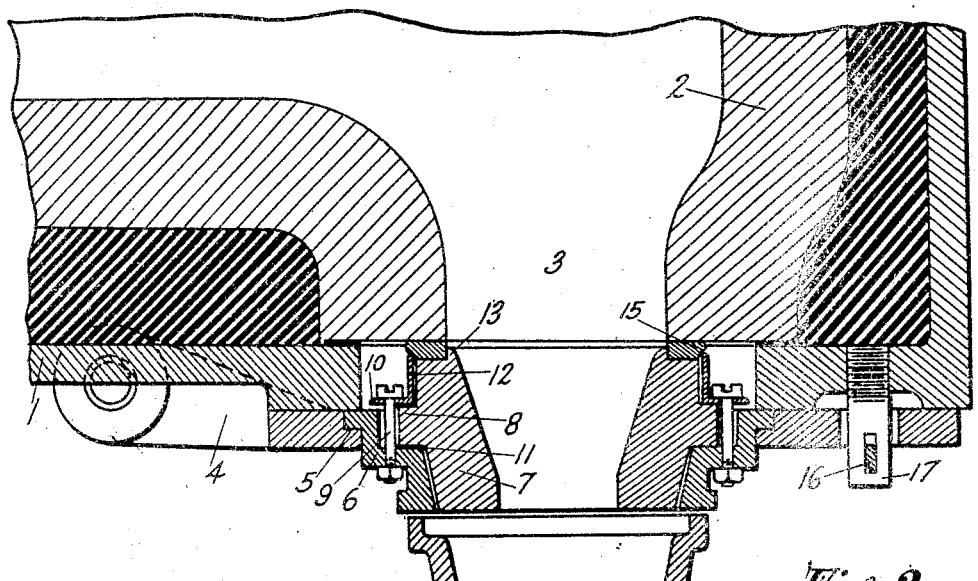
Figure 2 is a section similar to the section shown in Figure 1, showing the bushing in operative position.

In the drawings, the spout is shown at 1 as having a spout block 2 with a delivery orifice 3 therein. Mounted on spout 1 is a hinged member 4 having a shouldered aperture as at 5, within which aperture is a bushing container 6. The hinged member may swing into or out of operative position in the manner shown in the drawings.

The bushing container 6 is socketed in its upper face to receive a clay bushing 7, which bushing is provided with a shoulder 8 clamped to the socket member 6 by means of bolts 9 and ring 10 and having a gas-tight asbestos packing at 11. The clay bushing 7 is provided with a hole of a form to impart any chosen cross-section to viscous glass extruded therethrough and, since this proper cross-section must always be attainable, or for other reasons the bushing must be changed from time to time, it is necessary that the bushing be readily removable. It will be understood that the ring 10 is flexible to accommodate itself to inequalities and it will be noted that it has an upwardly extending flange 12 cooperating with a ridge 13 on the bushing top to produce a channel effect.

The preformed glass charges are produced by intermittent extrusion through the bushing, extrusion being prevented intermittently by the capping of the delivery orifice with a cup 14 to which gas is fed and burned under pressure.

Experience has demonstrated that, at the joint between the clay bushing 7 and the spout block 2, the glass has an almost irresistible tendency to seep in and cement the abutting surfaces of these elements together. Thus, when an attempt is made to separate the bushing 7 from the spout block 2, these elements adhere so tightly that they cannot separate without breaking one or the other. Likewise, the gas of the cup may force the glass upwardly so as to bare the joint of such gases, whereby the gases may escape, which is undesirable.

We have solved this difficulty, however, by the use of a ring of soft clay 15 which is first placed upon the upper irregular surface of the bushing 7 and which thereafter is compressed between the spout block and the bushing 7 when such bushing is moved into its proper position, as shown in Figure 2.

The clay used for this ring 15 is not only soft but it is of such a size and nature that, under the temperature that strikes it, it will not burn to anything like the degree of hardness attained by the elements which it separates and joins.

The device is simple but of utmost importance. The clay ring effectually seals the joint in question against either gas or viscous glass, and yet the bushing may be readily removed by merely swinging the member 4 downwardly. Ordinarily, the clay ring breaks away from the spout block 2, adhering to the upper face of the bushing 7. This is probably due to the increased surface area with which it contacts on such bushing. The soft clay may be so compressed that a portion will extend through into the downward path of the glass, but, this can be remedied by merely cutting off superfluous clay. The device is simple, but obviously efficient.

Figure 1:
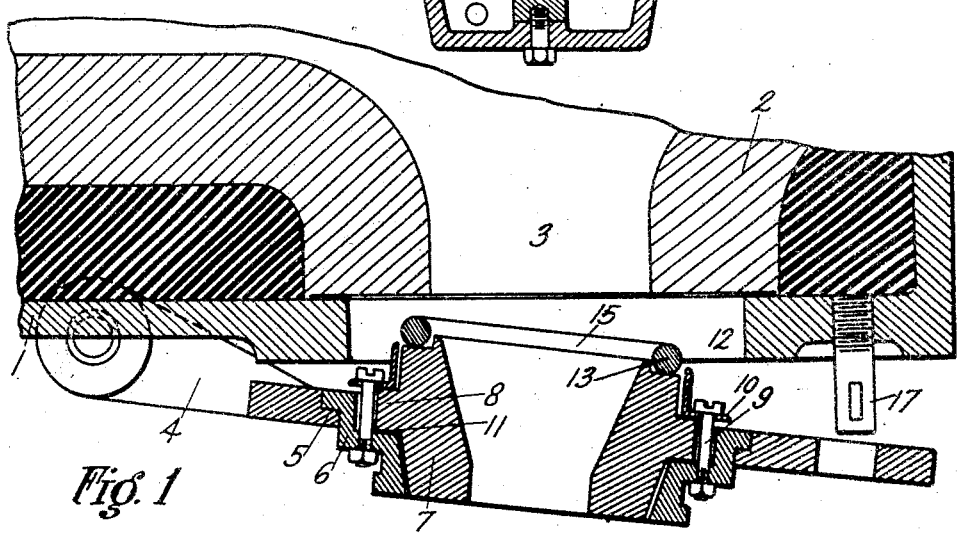
Figure 1 is a transverse longitudinal section of our improved bushing, with its novel sealing means, ready to be moved into operative position.
Figure 3:
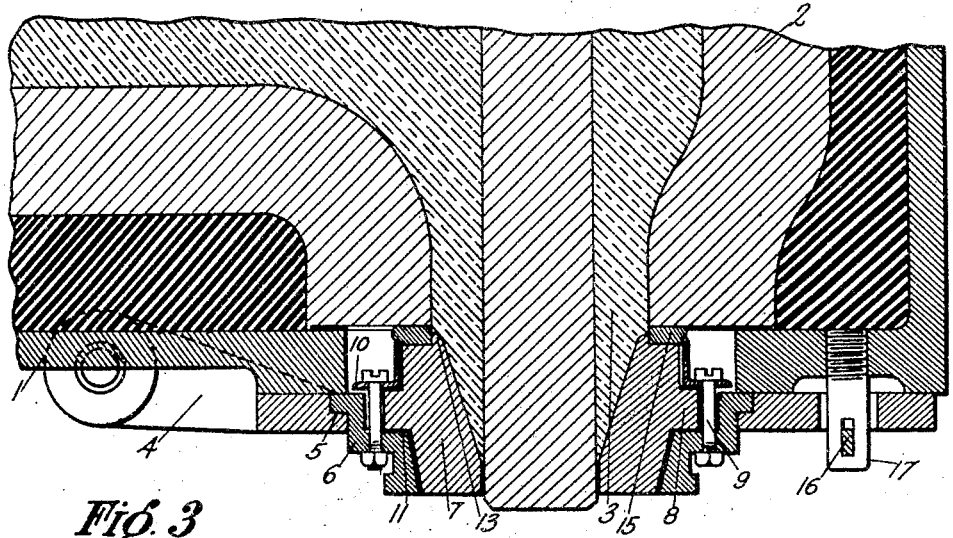
Figure 3 is a vertical longitudinal section showing our method of stopping the delivery of the glass from the orifice 2.
Figure 4:
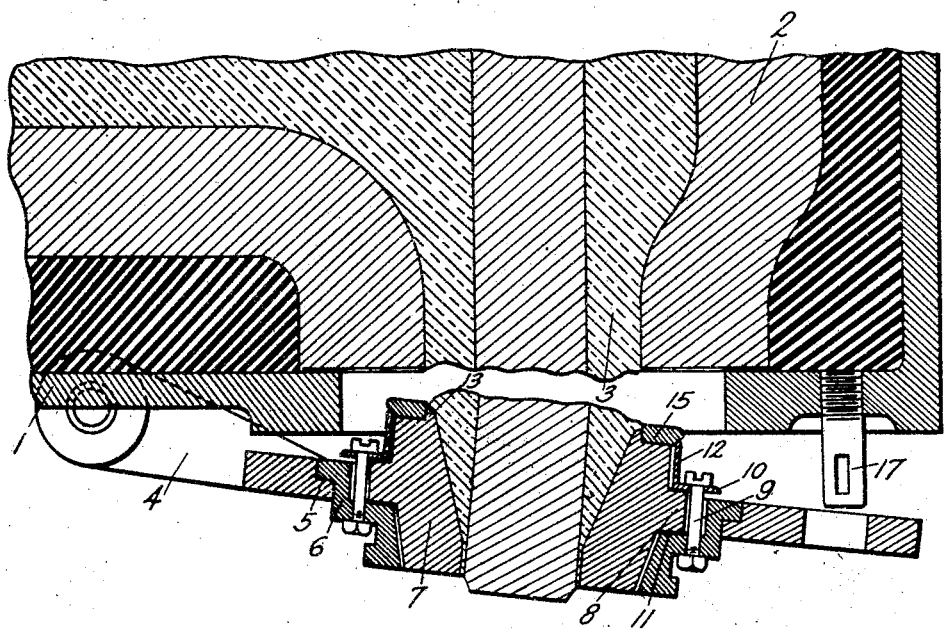
Figure 4 is a section similar to section 3 showing the bushing broken away from the spout block preparatory to complete removal from its supporting structure.

In operation, when it is desired to change a bushing, we preferably force a sand core into the delivery orifice, as shown in Figure 3. Then, after the glass has cooled adjacent the bushing, we release the hinged member and swing it down, breaking off the sand core and the surrounding glass in the process. Then, we remove the member 6 and substitute a new bushing for the one contained therein. When we have placed the member 6 carrying the new bushing in the hinged member, we superimpose thereon a soft clay ring as shown in Figure 1. Then, the hinged member is swung upwardly until the clay ring is tightly compressed, as shown in Figure 2. The hinged member is fastened in position by a wedge 16 extending through a bolt 17. If necessary, the interior upper edge of the bushing may be scraped to remove excess clay.

It is important to note that we have devised a method whereby a bushing may be changed in an extremely short period of time. With our device, a sand core may be inserted into the bushing and into the glass thereabove and then the bushing may be pulled away as soon as the glass within the bushing and adjacent thereto has slightly hardened. When this happens, the sand core will simply be broken off together with the glass within the bushing. It is also important to note that it is not necessary and, in the large majority of cases, not desirable to permit the main body of glass in the spout to chill. The chilling and hardening of the glass need only occur for a very slight distance above the joint between the bushing and the spout block. All practical glass workers will appreciate the importance of this great saving of time.

Having thus described our invention, what we claim is:

1. The method of applying and removing bushings for spout apertures which comprises interposing a sealing element between the bushing and the spout aperture when applying the bushing; and in removal, inserting a readily breakable core into the bushing and the glass thereabove, and breaking off both the bushing and the core after the glass adjacent the bushing is cold.

2. The method of applying and removing bushings for spout apertures which comprises interposing a plastic sealing element between the bushing and the spout aperture when applying the bushing; and in removal, inserting a readily breakable core into the bushing and the glass thereabove, and breaking off both the bushing and the core after the glass adjacent the bushing is cold.

3. The method of changing a bushing for a spout aperture which comprises inserting a readily breakable core into the bushing and the glass thereabove, and breaking off both the bushing and the core after the glass adjacent the bushing is cold.

4. The method of delivering viscous glass which comprises applying a bushing to the outlet of a spout for the delivery of glass therethrough, and inserting a frangible core into the outlet of the spout for stopping the flow of glass to permit the removal of the bushing.

5. In the art of delivering viscous glass, the method of removing a delivery bushing from a glass-delivering spout which comprises stopping the flow of glass with a core of sand, and then removing the delivery bushing.

6. In the art of delivering viscous glass, the method of stopping the flow of glass from a delivering spout which comprises inserting a frangible stopper into the glass above the outlet of the delivering spout.

7. A device for stopping the flow of viscous glass from a delivering spout comprising a frangible stopper.

8. A device for stopping the flow of viscous glass from a delivering spout comprising a sand stopper.

In testimony whereof we hereby affix our signatures.

OLIVER M. TUCKER.
WILLIAM A. REEVES.